William Don Miller
INVENTOR

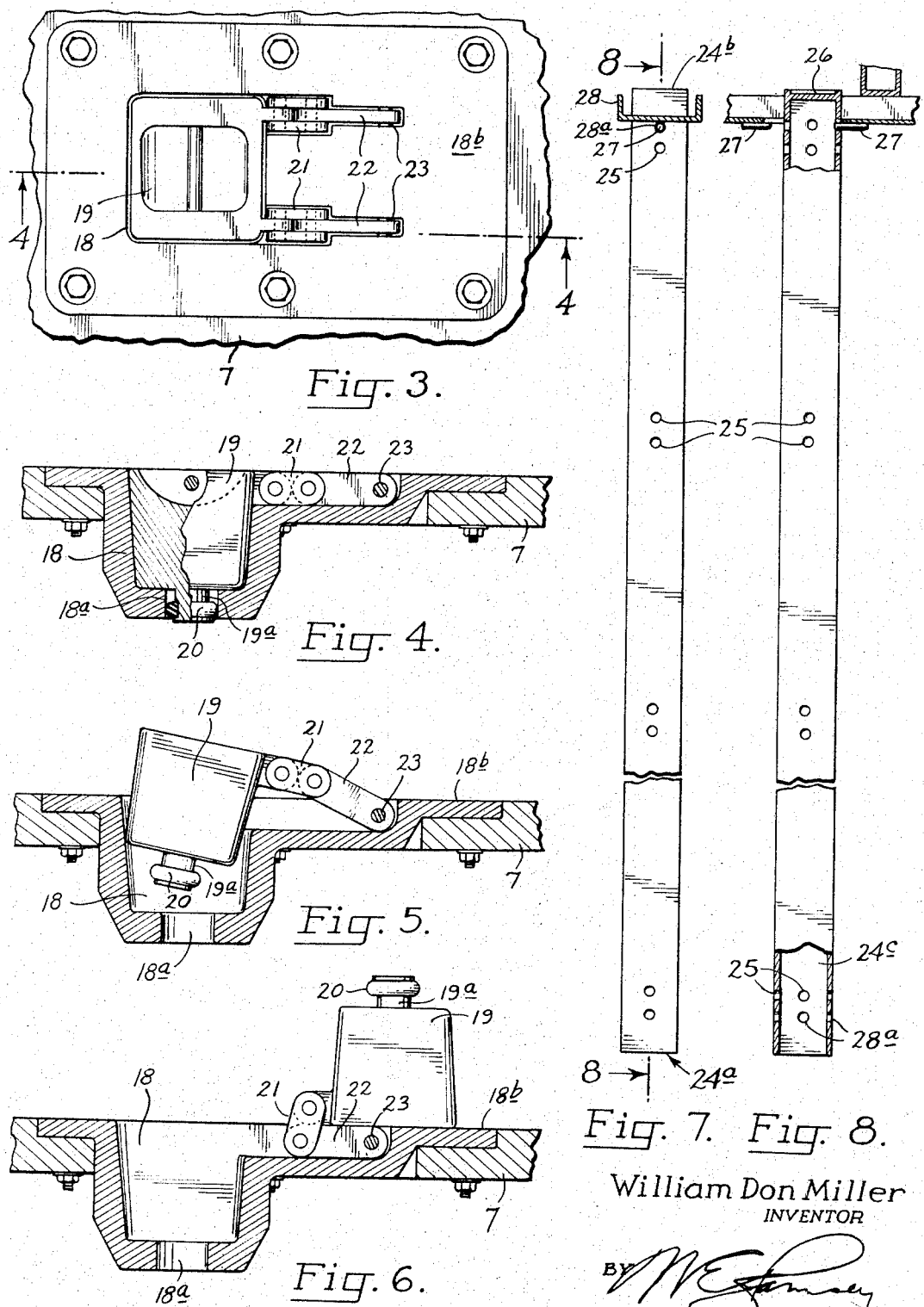

United States Patent Office 3,342,142
Patented Sept. 19, 1967

3,342,142
BRACING FOR RAILROAD BOXCAR
William Don Miller, 4303 SW. Vermont St.,
Portland, Oreg. 97219
Filed June 11, 1965, Ser. No. 463,124
6 Claims. (Cl. 105—369)

This invention relates to a loading brace assembly for use in a freight car. It is particularly adapted for use with loads comprising flat sheets, such, for example, as wallboard, plywood, and similar products that may be made up into rectangular packages. Cargo of this character normally is strapped together so that it may be handled as a unitary package.

A common unitary package is four feet by eight feet by two and a half feet. This type of cargo permits plywood, for example, to be stacked four tiers high with five stacks at one side of its central lateral door openings of a car and six stacks at the other end thereof. Immediately adjacent the doors, or a lateral door in a car, stacks of plywood are located side by side with their longitudinal axes extending lengthwise of the car. The lateral doorway or doorways must exceed the longitudinal dimension of these packages of cargo, so that they may be moved straight in by lift trucks with their longitudinal dimensions lengthwise of the car. Boxcars adapted for this type of cargo have an interior width of nine feet six inches and are fifty to sixty-two feet in length.

Despite such preselection of cargo dimension with that of a railway boxcar, storing of cargo may not be accomplished with such exactitude that shifting of cargo in transit is inhibited, without involving removable bracing. It is thus common to build bracing into the cars, so that the cargo is prevented from shifting both laterally and longitudinally. All of the foregoing is by way of preface to explain the problem to which this invention is directed.

A principal object of my invention is to provide a type of bracing that may be quickly installed and dismembered at the end of a journey, one that will not be destroyed or thrown away at the end of the journey, and one that may conveniently be returned for use on a succeeding trip.

Further and more particular requisites for cargo bracing are:

(1) The bracing and its installation must be compact and simple.

(2) The bracing must be easily and quickly mounted and dismounted at the beginning and end, respectively, of the journey.

(3) Any means of attachment should not interrupt or project from the floor or side walls of the freight car to damage the cargo or to impede the movement of cargo into and out of the car.

(4) The bracing must make the load secure against any substantial shift or movement, laterally or longitudinally, of the freight car.

(5) The bracing must not occupy any of the potential loading or storage space in the car.

(6) Bracing must permit smooth and easy access by mechanical loading and unloading apparatus, as, for example, fork or lift truck.

(7) Bracing must promote freedom from so wedging against cargo as to eliminate the necessity for prying tools to aid in unloading.

(8) Bracing must promote safety for the personnel engaged in loading and unloading the cargo.

(9) Bracing must aid and accommodate ventilation for the cargo, particularly for that type of cargo affected by heat and moisture.

All of the foregoing requisites are accomplished in structure embodying my invention, which includes a loading brace assembly comprising vertical, elongated members that may be secured both to the roof and to the floor, respectively, of a freight car at preselected locations by fixed securing devices designed so that the floor and wall surfaces remain plane and unbroken, as far as cargo movement thereover is concerned. Said braces are engageable with and disengageable from said securing devices, which are aligned in rows, one row lying adjacent each of spaced side walls but spaced therefrom a distance related to a cargo dimension, and yet permitting access for loading and unloading mechanism to shift stacks of cargo without difficulty.

Details of my invention, and the manner in which said objects are attained, are hereinafter described with reference to the accompanying drawings, in which:

FIG. 3 is a plan view showing a securing device of modified form and embodying my invention engaging the floor of a railroad car, and shown recessed in said floor;

FIG. 4 is a sectional view through said modified form of mounting device, taken on the line 4—4 of FIG. 3;

FIG. 5 is a view similar to FIG. 4 showing the securing device having its filler plug as being partially removed therefrom;

FIG. 6 is a similar view showing said filler plug lifted from the recess for accommodating the lower end of a vertical brace and lying upon the plane of the floor surface of a railroad car;

FIG. 7 is a foreshortened elevation of a vertical bracing member embodying my invention and extending through a roof member in a railroad boxcar; and FIG. 8 is a partial section through said vertical member taken on the line 8—8 in FIG. 7.

Figures 1, 2:
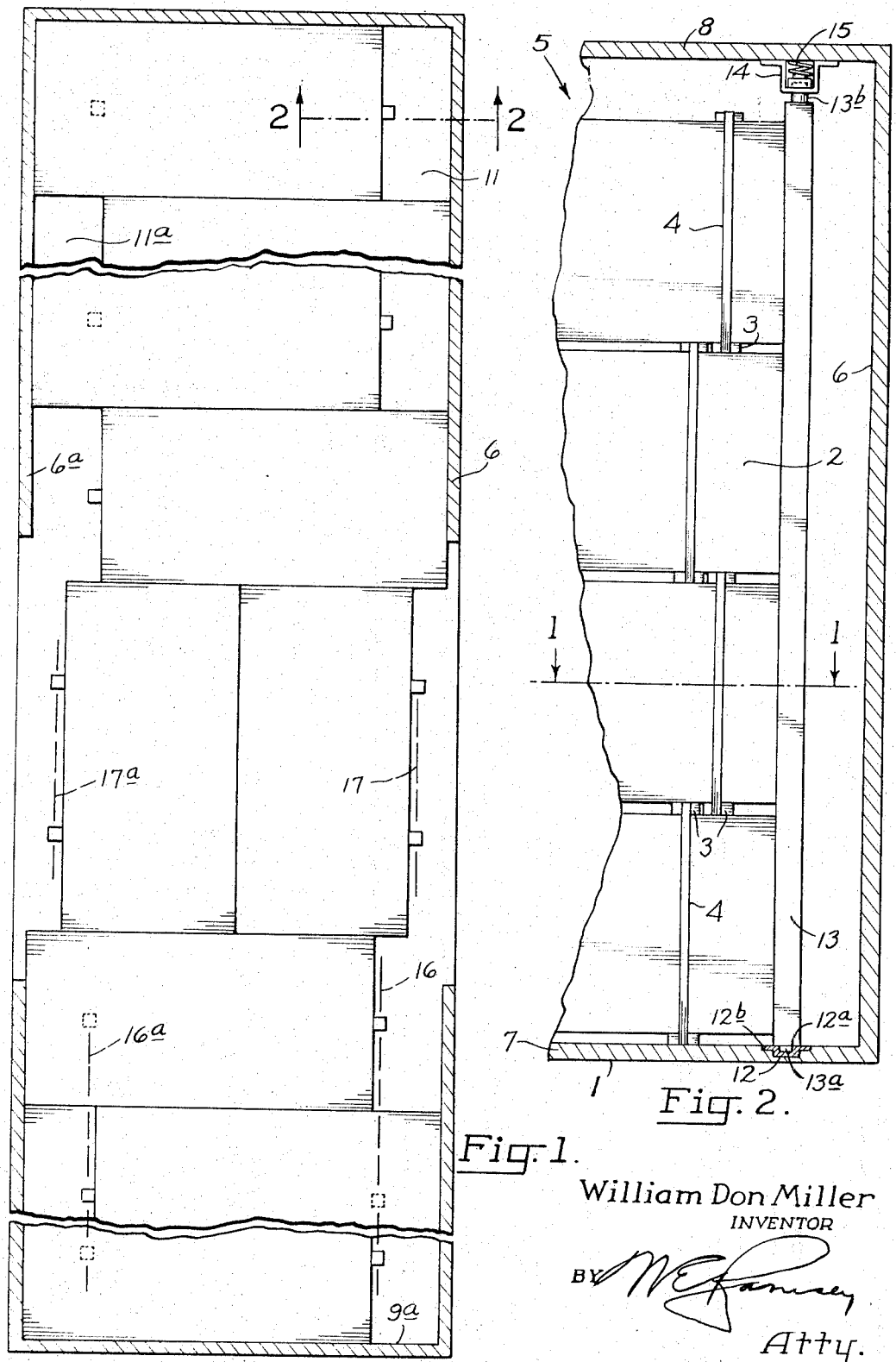
FIG. 1 is a plan view shown foreshortened showing a typical arrangement of stacks of cargo with bracing arranged in accordance with my invention, said section being taken on the line 1—1 in FIG. 2.
FIG. 2 is a vertical section taken on the line 2—2 in FIG. 1, illustrating the manner in which stacks of rectangular units of cargo may be placed one upon the other and braced by a common tubular member engaging the roof and floor of a railroad car.

First, referring to FIG. 1:

As is shown in said figures, an elongated railroad boxcar 1 is selected that has some relationship to the packaged type of cargo with which my invention is particularly concerned. In the Pacific Northwest, plywood is shipped transcontinentally. It is sold in a closely competitive market, and thus all operations concerning the manufacture and shipping of plywood must be concerned with the cost thereof.

As is shown in FIG. 2, plural bundles 2 are stacked one upon the other separated by spacers 3 that are usually held to a particular bundle by strapping 4. It is common to stack said bundles four high to constitute a stack 5. The stacks are alternately offset as is shown in FIG. 1. That is to say, one stack with its longitudinal dimension is arranged to abut against a side wall 6 of a boxcar and be spaced from the side wall 6a, at the opposite side of said car. This is done to promote lateral stability and balance in placement of cargo in a boxcar with respect to its longitudinal center line.

The floor 7 of said boxcar has a plane and smooth inner surface and the roof 8 is more or less plane. The end walls 9–9a of the boxcar are also plane and vertical. A boxcar with which my invention is particularly concerned is one that would have an interior width of nine feet six inches and length of from 50 to 60 feet. In such length of car, five stacks of cargo would be arranged at one end of the door openings 10, and six stacks at the other side thereof. Immediately between the door openings, two stacks would be arranged with their longitudinal dimensions arranged lengthwise of the boxcar.

With a car having a nine and one-half foot interior width, and adapted to accommodate a stack of bundles eight feet in length, there would be a space eighteen inches left at one end thereof. This space 11 is arranged at one end of each alternate stack of bundles, and another space 11a is arranged at the adjacent stack of intermediate bundles.

Lying eighteen inches in from the side wall of a boxcar incorporating my invention is a series of sockets 12. One such socket is shown in FIG. 2, and others are indicated by squares in FIG. 1. These sockets are recessed at 12a, and the marginal flanges 12b extend laterally from the recesses, with the upper faces lying in the plane of the floor 7. An elongated vertical brace 13 can be arranged in a selected socket, as is shown in FIG. 2. The brace has an axially projecting trunnion 13a at its lower end and centrally thereof. At the opposite end is a trunnion 13b, which is slightly longer, as is shown in FIG. 2. The upper trunnion 13b fits snugly within a bracket 14 secured to the under side of the roof 8 of the car. Bearing axially of said upper trunnion is a helical spring 15. The purpose of said spring is to bias the brace into seated position with its trunnion 13a in the floor socket and with its upper trunnion 13b arranged within the confines of the apertured bracket 14.

When it is desired to remove the brace from the socket and bracket, respectively, it is lifted vertically until the shorter trunnion 13a is free of the socket recess 12a. This compresses the helical spring, and permits the lower end to be moved laterally until the upper trunnion may be pulled free from the apertured bracket 14 and removed from bracing position. I preferably arrange a row of sockets eighteen inches spaced from the adjacent side wall. Thus, the two rows of sockets are identified as 16–16a. They lie eighteen inches away from each adjacent wall and eight feet away from the distant wall. By arranging a pair of sockets for each cargo space, that is optionally to provide sockets for each stack of bundles, accommodation is made for permitting the prearranging and offsetting of the stacks, alternately. Of course, when a stack is moved laterally and abuts against a wall, the socket is covered. The socket at the opposite end of the stack, however, is uncovered, and thus, when a brace is placed in position, it holds a stack of bundles against lateral displacement.

In the middle portion of the car lying intermediate the apertures of the aligned doorways or openings 10 are two rows of sockets 17–17a. These two rows are spaced from the planes of the side walls nine inches each, and thus, two stacks lying side by side spanning eight feet will be engaged at their sides by four braces. Lateral movement will be inhibited due to the fact that the braces fit rather snugly against the sides of the stacks.

In all bracing for boxcars with which I am familiar, it is necessary to fix braces snugly against either a side face or an end face to prevent shifting. Usually each stack of boxed or stacked cargo has two braces at each side to prevent the stack from canting or sliding laterally of the braces thus arranged. I have discovered that one brace embodying my invention is sufficient for each end of a stack of bundles. Seemingly, if a stack tends to slide, it tends to rack or cant and thus become wedged, and thus will not move in a distance laterally of the opposed faces of the braces. The stacks become wedged, and before they can shift substantially, they are locked into position.

Stacks can be arranged in any order in a boxcar; that is, either end may be filled without affecting the storage of cargo in the opposite end. Likewise, the ends may be filled simultaneously. The position of the two central stacks between the two rows of braces 17–17a afford sufficient space for accommodating bundles straight into and out of a boxcar by the use of lift or fork trucks.

It is impractical to design the interiors of boxcars to conform to the dimensions of the bundles to be accommodated therein, thus to avoid the necessity of bracing laterally of the car. The bundles would become wedged, and, in shifting them into and out of place, they would become damaged. By leaving a space at one end of each of the bundles, sufficient space is provided when the brace at one end of said bundles is to be removed, because a lift or fork truck can then move the stack of bundles laterally sufficiently to relieve the brace to permit it to be removed. Thereafter the entire stack is free to be manipulated for loading or unloading, and particularly the latter.

Next, referring to the modification illustrated in FIGS. 3 to 8 of the drawings:

In many instances, it is desirable to leave the floor of a boxcar with no interruptions along its floor. Thus, I provide sockets 18 with hingedly mounted tapered plugs 19 that may be interfitted therein, as is shown in FIG. 4, or lifted therefrom, as is shown in FIG. 6. The sockets have an aperture 18–18a leading to the atmosphere, and the plugs have a protuberance 19a that fits into the aperture 18a. If it is desired to make this fit tightly and to be moisture proof, I provide an O-ring 20 on each of the protuberances to seal the tapered side of the aperture 18a, as is shown in FIG. 4. Joined laterally to each of the plugs is a pair of hinged links 21–22 articulated by pivot pins 23, which are thus jointed to permit the plugs to be swung laterally and seated with their larger ends upon the plane of the boxcar floor, as is shown in FIG. 6.

The socket plugs are formed with their bases 18b of larger diameter and may be seated with said bases flush with the plane of the floor, as is shown in FIG. 4, and resting upon the floor and lying above it, as is shown in FIG. 6, when the socket is to be used for holding the lower end of a brace 24. A lateral slot 18c is also formed in the socket for accommodating the links 21– 22.

All of these apertures are rather close fitting so that the surface of the floor is smooth and presents no pockets, as is shown in FIGS. 3 and 4. Said sockets are arranged so that they will swing out toward the adjacent side wall and will lie in the space provided between the rows of sockets 16–16a and 17–17a lying between a row of sockets and the adjacent inner surface of a wall. This space is not used, as has been commented on, and thus the plugs can be arranged lying above the floor without interfering with the loading or unloading operation of stacks.

A different modification of brace 24 is provided, as is illustrated in FIGS. 7 and 8, respectively. These braces are of hollow rectangular form, and are provided with plural perforations 25, preferably formed in groups with perforations through all four sides of a brace. The lower end 24a of each brace is open to the atmosphere, and the upper end 24b is closed by a transverse web 26. Locking pins 27 are carried by a beam 28 at the ceiling of a boxcar. Thus, when the upper end is arranged in position, these pins can enter aligned apertures 28a. With the plug removed, as is shown in FIG. 6, air can circulate up through the bore 24c of each beam from the atmosphere, and will be free to pass out into the interior of the boxcar through related perforations 25.

The purpose of communication between the atmosphere and the interior of the boxcar is to promote ventilation. It has been my experience that plywood and lumber are frequently somewhat hot, if it has been newly laid up, or if it has been collecting upon a heated siding, and it is necessary that this temperature be dissipated en route. Also, moisture present should be permitted to evaporate and escape from the interior of the boxcar. If it is not needed to provide such ventilation, the braces may be turned end-for-end with the closed end 26b arranged downwardly and the end 26a arranged upwardly. In this position, the web 26 closes off the bore of the brace and no flow of air is permitted between the interior of the boxcar and the atmosphere.

As has been pointed out heretofore, in both types of braces they lie in a space laterally of the end of bundles, and if there is any tendency of bundles to slide, they will cant relatively and will be held against longitudinal movement, as well as lateral movement. Thus, when these bundles have to be unloaded, it will be necessary for them to be "squared up" by lift trucks at the point of discharge or unloading. This may be done by the use of lift trucks themselves and do not require pry bars or similar levers to move them. Prying or wedging might damage the panels or other products forming the bundles. When wooden bracing or so-called dunnage is used, it is necessary that some additional tools be provided, such as wrecking bars or hammers, in order to remove the bracing. This produces time consumption, loss of material, and the need for additional tools, which are all avoided by my invention. It has been my experience that over an hour's time is saved due to the use of braces embodying my invention rather than with the present means, with which I am familiar.

The braces are of simple form, and may be made of standard extruded or rolled and bent shapes, such as U-bars, channels, angles, structural tubing, and the like, which may be edge joined together by welding and do not require any special shapes. In any case, the connections may be made between the braces and their upper and lower sockets merely by first lifting each post and then pushing it down endwise into the floor socket. Posts or braces can be removed by reversing the order of said movements, first by lifting the upper end through the socket, then swinging it laterally. This may be done by lifting the braces upwardly in the embodiment shown in FIGS. 1 and 2 or by moving them up through the beam after first removing the pins, as is shown in the modifications shown in FIGS. 3 to 8. Each of the braces is made of lightweight section and is hollow bored so that the braces may be lifted easily by a workman without physical strain.

The braces are elongated and have small cross-sectional area, and thus, if they are not needed in a boxcar to brace cargo, they may be stowed away compactly to await their use with a subsequent cargo for which they are specifically designed.

Although braces are designed, primarily, for use with lumber and lumber products, such as dimension lumber and plywood, as well as particle-board and wallboard, such braces may be used in connection with any general cargo which may be formed into a rectangular package, and preferably held in such package by a strap or band surrounding a box or crate.

I claim:

1. A load bracing assembly for a railway freight car having a floor, a related pair of spaced sidewalls and end walls, a roof structure, one sidewall having a door opening arranged intermediate the two spaced end walls, the interior of said freight car at each end thereof between the door opening and the end wall at such end defining plural rectangular cargo spaces to accommodate therein packaged rigid cargo units, each cargo space terminating laterally of the freight car at one of said sidewalls and being spaced from the other sidewall of a pair, said load bracing assembly comprising releasable, elongated, vertical brace members each engaging the floor by one of the ends thereof and engaging the roof structure by the other end thereof, one vertical brace member being adjacent the midline of each cargo space, pinning rigid cargo within said space against said one sidewall of the railway freight car, permitting rigid cargo to rack or cant in transit and thus become wedged within said cargo space between said one vertical brace member and the said one sidewall of the railway freight car.

2. The organization defined in claim 1, including disengageable sockets in vertically related and aligned pairs for the ends respectively of each vertical brace member, one of each of the related pairs being secured in the floor and the other being secured to the roof structure.

3. The organization in claim 1 including disengageable sockets in vertically related and aligned pairs for the ends, respectively of each vertical brace member, one of each of the related pairs being secured in the floor and the other being secured to the roof structure, the sockets being arranged longitudinally of the freight car in aligned rows and at modular distances from each other.

4. The organization in claim 1 including disengageable sockets in vertically related and aligned pairs for the ends, respectively of each vertical brace member, one of each of the related pairs being secured in the floor and the other being secured to the roof structure, said brace members being tubular, defining a central bore, and certain of said sockets opening to the atmosphere through the floor of said freight car.

5. The organization defined in claim 1, including disengageable sockets in vertically related and aligned pairs for the ends, respectively of each vertical brace member, one of each of the related pairs being secured in the floor and the other being secured to the roof structure, and said brace members being tubular, defining a central bore, certain of said sockets opening to the atmosphere through the floor of said freight car, said brace members having conforming and interchangeable ends, being closed at one end only to accommodate or to interrupt flow of air through an open socket, depending upon whether the closed end fits the roof socket or the floor socket, respectively.

6. A loading brace assembly for use in a railway freight car having a floor, related pairs of spaced side walls and end walls, and a roof structure, one side wall having a door opening arranged intermediate the two spaced end walls, comprising releasable elongated vertical brace members each engaging the floor by one of the ends thereof and engaging the roof structure by the other end, disengageable sockets arranged in vertically related and aligned pairs for said one end of a brace member and for said other end, respectively, one of said related socket pairs being secured in the floor and the other being secured to the roof structure, said brace members being tubular, defining a central bore, certain of said sockets opening through the floor of said freight car to the atmosphere, and lateral apertures extending through the tubular walls from the bore to the periphery of said brace members lying at points intermediate the ends of the brace members, thereby to promote air circulation in said freight car through said brace members.

References Cited
UNITED STATES PATENTS

| 617,623 | 1/1899 | Young | 105—369 X |
| 721,886 | 3/1903 | Glover | 105—367 |
| 1,499,229 | 6/1924 | Laffey | 105—369 |
| 1,665,439 | 4/1928 | Brown | 105—369 |
| 2,336,869 | 12/1943 | Johnson | 105—369 |
| 2,340,374 | 2/1944 | George | 105—369 |
| 2,369,784 | 2/1945 | Johnson | 105 369 |
| 2,820,667 | 1/1958 | Benaroya et al. | 105—369 X |
| 2,834,304 | 5/1958 | Chapman et al. | 105—369 |
| 3,062,157 | 11/1962 | Woods | 105—369 |
| 3,073,260 | 1/1963 | Dunlap et al. | 105—369 |

ARTHUR L. LA POINT, *Primary Examiner.*

DRAYTON E. HOFFMAN, *Examiner.*